Sept. 27, 1927.

B. F. SEYMOUR

VEHICLE SUSPENSION

Filed Feb. 28, 1920

1,643,681

2 Sheets-Sheet 1

Inventor.
B. F. Seymour,
by H. H. Byrne
Atty.

Sept. 27, 1927.　　B. F. SEYMOUR　　1,643,681
VEHICLE SUSPENSION
Filed Feb. 28, 1920　　2 Sheets-Sheet 2
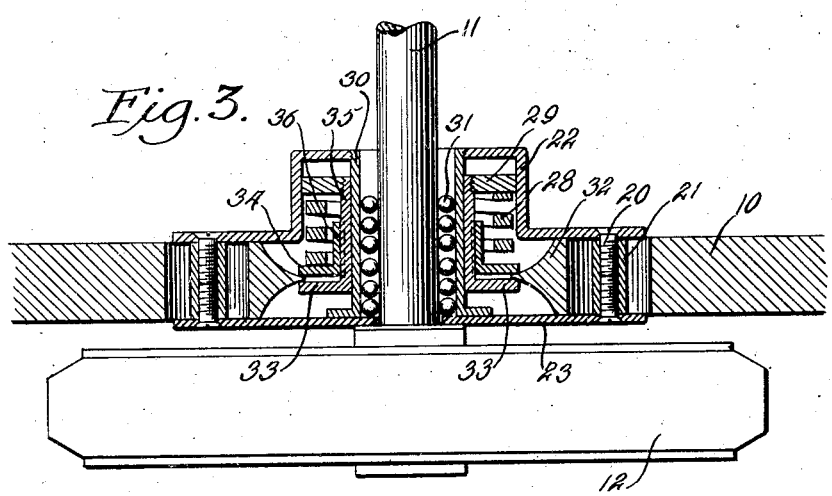
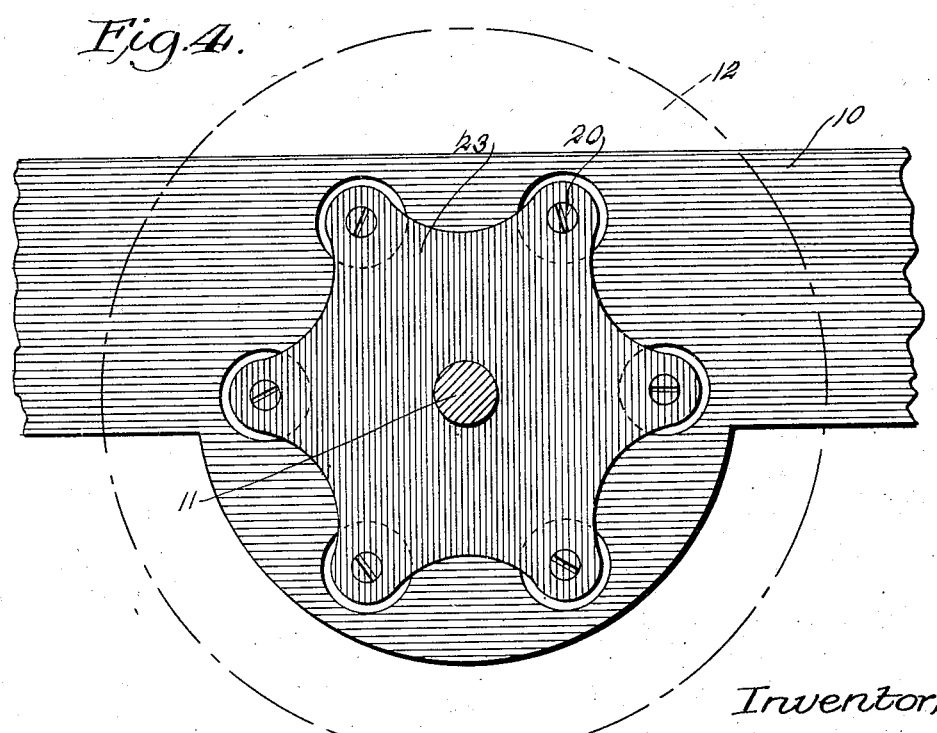
Inventor,
B. F. Seymour,
by H. H. Byrne
Atty.

Patented Sept. 27, 1927.

1,643,681

UNITED STATES PATENT OFFICE.

BENJAMIN F. SEYMOUR, OF WASHINGTON, DISTRICT OF COLUMBIA.

VEHICLE SUSPENSION.

Application filed February 28, 1920. Serial No. 361,994.

The present invention relates to resilient suspensions for vehicle bodies and consists in the combinations and arrangements of elements hereinafter described and particularly set forth in the accompanying claims.

The purpose of the invention is to provide the body of a vehicle, especially of the motor driven type, with resilient means for indirectly absorbing and dissipating all shocks or jars to which the vehicle wheel is subjected, and without causing undue strain on either the wheel or its axle or transmitting excessive vibration to the supported load.

Another object of the resilient suspension as proposed herein is the employment of apparatus and disposal of the elements thereof in such a manner as will secure the maximum stability of the resilient sustaining structure, and most suitable location or distribution of the resilient devices per se with regard to the chassis or frame on which the same are mounted.

Figure 1:
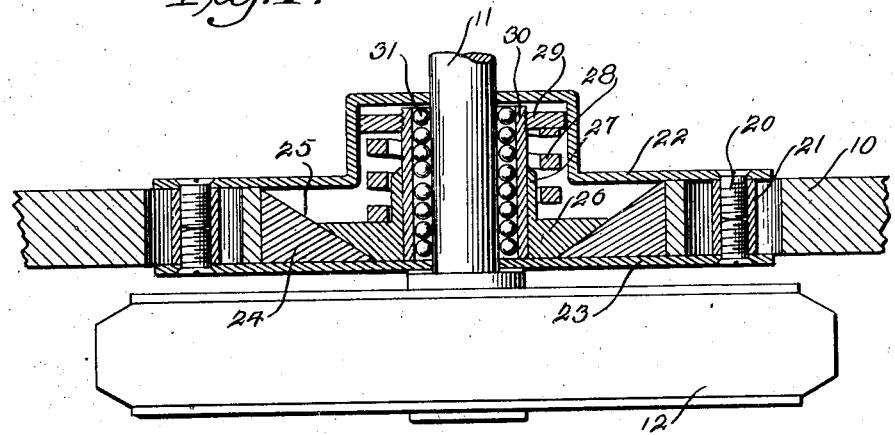
Figure 2:
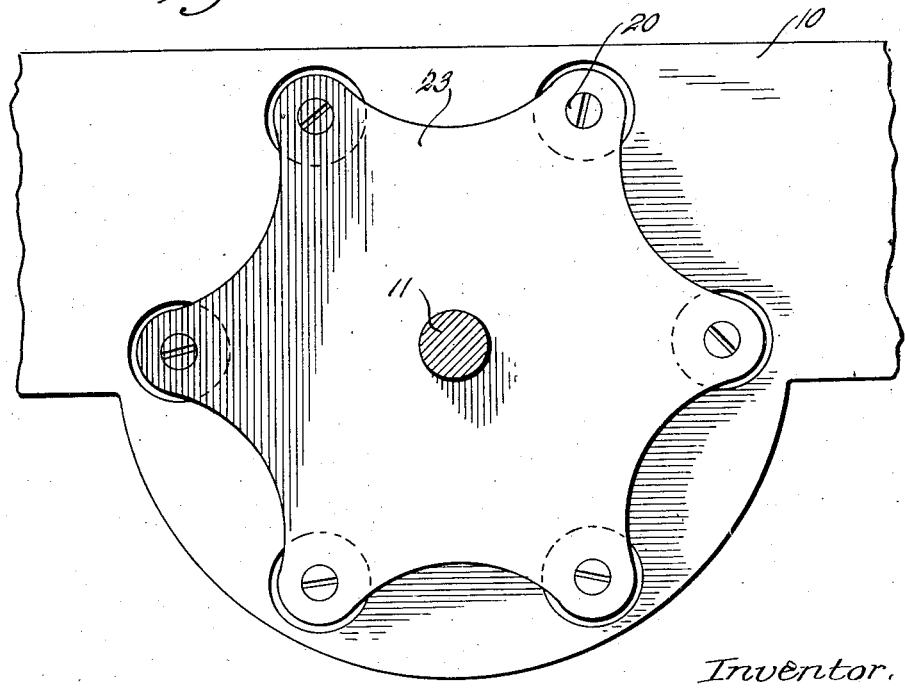

The invention is disclosed by way of illustration in the accompanying drawings, wherein:

Fig. 1, a horizontal sectional view of the preferred construction;

Fig. 2, a side elevational view of the structure shown in Fig. 1;

Fig. 3, a horizontal sectional view of a modified construction; and

Fig. 4, a side elevational view of the arrangement shown in Fig. 3.

Referring to the construction in further detail, and wherein like reference characters designate corresponding parts in the different figures shown, the apparatus consists of the chassis or frame 10 of the vehicle having the usual wheel 12 journaled on the wheel support or axle 11 in any well known way. Any suitable type of anti-friction bearing, e. g., balls or rollers 31 and a retaining case 30 therefor may be provided.

Interposed between said chassis 10 and the vehicle axle 11 is the resilient suspension comprising a pair of side plates 22 and 23 suitably clamped to either side of the chassis 10 by a series of pairs of bolts 20 having screw threaded engagement with the sleeves 21, which serve as spacing members for said side plates, and immediately surrounding said sleeves 21, the chassis or frame 10 is cut away to give the necessary clearance for the relative movement between the wheel support or axle and the chassis or frame.

Between the two side plates 2 and 3 the portion 10 is free to have limited movement.

In the construction shown in Figs. 1 and 2, the side plates 22 and 23 provide a housing or chamber for the inner rim portion or ring 24, which is provided with an inclined surface 25, or cone element that coacts with a cone head 26, that is adapted to move in the lengthwise direction of the axle under tension, and by such movement to take up and cushion any relative movement in a transverse direction between the chassis 10 and the wheel support or axle 11.

The cone head 26 is formed with a sleeve 27 slidably mounted on the collar 30, which retains the ball bearings 31, and a spring 28 of the desired strength and resiliency surrounds said collar and is disposed against the cone head 26 and adjustable ring 29 that is screw-threaded on the collar 30, as shown. By adjusting said member 29, the spring 28 may be brought to the tension required for holding the cone elements 25 and 26 in proper coacting relation.

In the construction shown in Figs. 3 and 4, the chassis 10 is formed, within the head with the portion 32 constructed to form an annular wedge element having opposed and similar wedge surfaces, and coacting with these parts is a pair of disks 33 and 34 having telescoping sleeve portions 35 and 36, that are slidably mounted on the collar 30. Said sleeves are adapted to have limited sliding movement on said collar against the tension of the spring 28 when the elements 33 and 34 are separated by the wedging action of the part 32, and for a further disclosure of this type of construction and the principles under which the same operate, reference may be had to my co-pending applications for U. S. patents bearing the Serial Nos. 302,415 and 330,374 filed June 7, 1919, and Oct. 3, 1919, respectively.

It is obvious that those skilled in the art may vary the details of construction and arrangement of parts without departing from the spirit of my invention, and therefore I do not wish to be limited to such features except as may be required by the claims.

Having thus described my said invention, what I claim as new and desire to protect by United States Letters Patent is:

1. In a resilient suspension for vehicle bodies, the combination of a chassis, a wheel axle, and an axially movable member provided with an annular collar element, a sleeve member mounted around said member and provided with a cooperating collar element, a member fixedly mounted on the chassis and having an annular wedge surface cooperating with said collar elements, and a spring holding said collar elements and annular wedge surface in cooperative relation, substantially as set forth.

2. In a resilient suspension for vehicle bodies, a journal housing mounted in said body and adapted to have limited movement therein in a plane radial to the axis of said housing, a wheel axle supported in the housing to revolve therein, annular wedging elements for the axle, and a spring tending to hold the elements in cooperable position thereby centering the axle, substantially as set forth.

3. In a resilient suspension for vehicle bodies, a journal housing mounted in said body and adapted to have limited movement therein in a plane radial to the axis of said housing, a wheel axle supported in the housing to revolve therein, annular wedging elements for the axle, and a spring tending to hold the elements in cooperable position thereby centering the axle, one of said elements being fixedly and the other movably mounted with regard to the vehicle body, substantially as set forth.

4. In a resilient suspension for vehicle bodies, a journal housing mounted in said body and adapted to have limited movement therein in a plane radial to the axis of said housing, a wheel axle supported in the housing to revolve therein, a member axially movable in the housing, a fixed member in said body, said members being provided with inter-engaging annular wedging surfaces, and a spring adapted to hold said members in cooperative relation with each other, thereby centering the axle, substantially as set forth.

In witness whereof, I have hereunto affixed my signature.

BENJAMIN F. SEYMOUR.